UNITED STATES PATENT OFFICE.

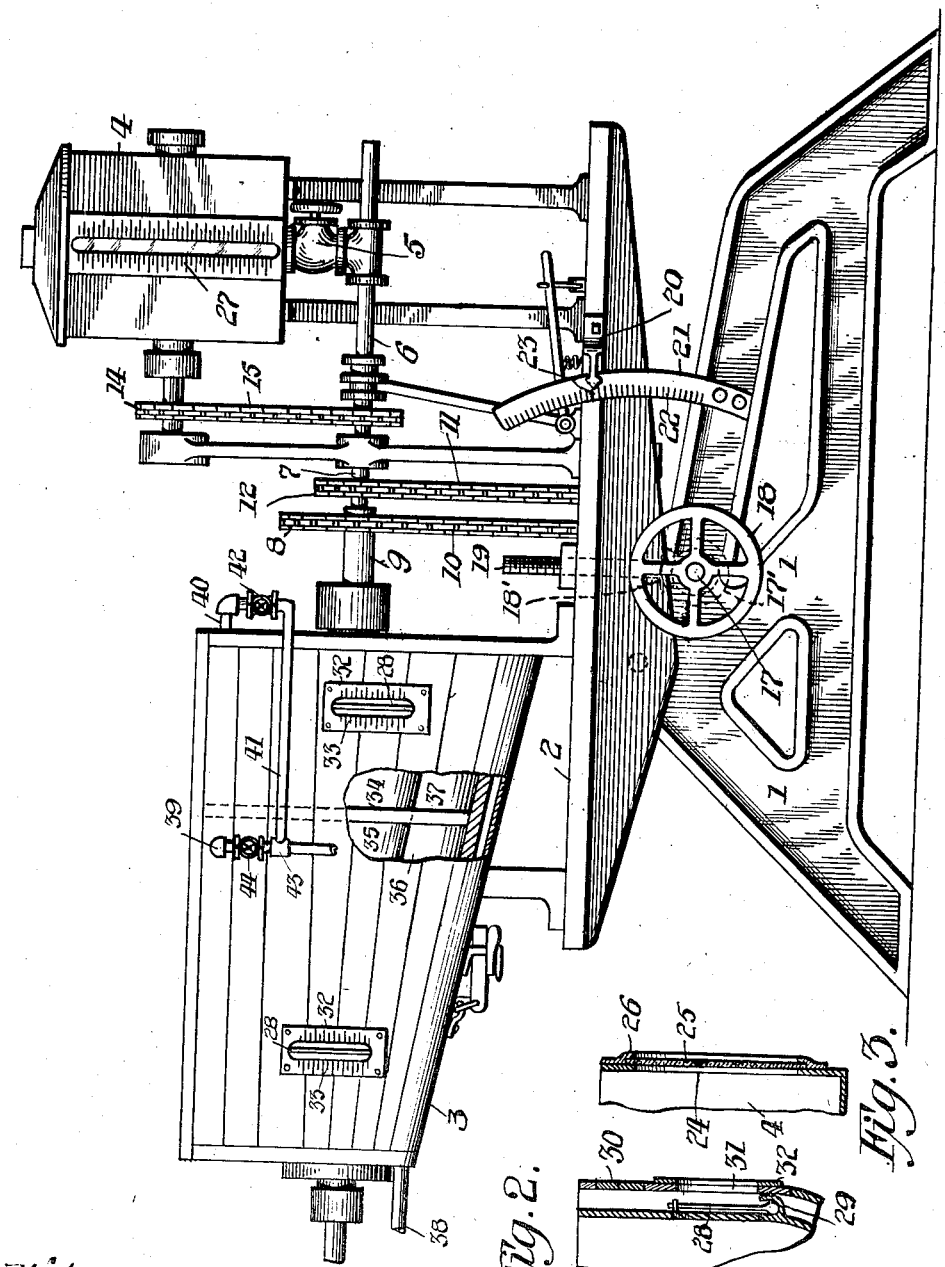

HENRY J. GERNER, OF VANDERGRIFT, PENNSYLVANIA, ASSIGNOR TO MARY GERNER, OF CANTON, OHIO.

ICE-CREAM FREEZER.

No. 859,876.　　　　Specification of Letters Patent.　　　Patented July 9, 1907.

Application filed July 2, 1904. Serial No. 215,057.

*To all whom it may concern:*

Be it known that I, HENRY J. GERNER, a citizen of the United States of America, residing at Vandergrift, in the county of Westmoreland and State of Pennsylvania, have invented certain new and useful Improvements in Ice-Cream Freezers, of which the following is a specification, reference being had therein to the accompanying drawing.

This invention relates to certain new and useful improvements in ice cream freezers, and more particularly to a continuous ice cream freezer of the type shown and described in Letters Patent of the United States granted to me January 12th, 1903, No. 749,286.

The object of my present invention is to provide novel means in connection with the freezer for determining the amount of cream that has been frozen, and novel means for governing the consistency of the cream during the process of freezing the same.

The construction employed to accomplish the above results consists in the combination of devices to be hereinafter described and claimed, and reference being had to the drawing accompanying this application, wherein like numerals of reference indicate like parts throughout the several views in which Figure 1 is a side elevation of a machine of the type set forth in my prior application, showing my improvements thereon, Fig. 2 is a vertical sectional view of a portion of the freezing tub, and Fig. 3 is a vertical sectional view of a portion of the reservoir.

My present improvement, as heretofore stated, resides in the provision of novel means in connection with the freezer whereby the consistency of the cream may be governed to produce a finer or lower grade of cream as may be desired, and also novel means in connection with the freezer to determine with what rapidity the cream is being frozen and just what quantity of cream has been frozen.

In order to familiarize those not conversant with the general construction and operation of my improved freezer, a brief description will now be given in order that my present improvement will be readily understood and the advantages of the same appreciated.

The freezer consists of a frame work 1 upon which is pivotally mounted a tilting table 2 and upon one end of this table is mounted the freezing agent tub 3 in which is located the freezing can in which the cream is to be frozen. Upon the other end of the tilting table is mounted a cream reservoir 4 from which cream is fed through a valve 5, a pipe 6 to the freezer can pipe 7, and by the location of this reservoir it will be observed that cream is continually fed to the freezing can when the valve 5 is open. In my improved freezer I have provided means for revolving the dasher within the freezing can in an opposite direction from that in which the freezing can is rotated, this means consisting of a sprocket wheel 8 mounted on the sleeve 9 of the can and over which passes a chain 10, a rotary motion being imparted to the can by the chain which also passes over the main operating shaft mounted in the frame of the machine. The dasher shaft is reversibly geared to the main operating shaft through the medium of sprocket chain 11 and sprocket wheel 12 mounted on the pipe 7. In connection with the reservoir 4 I mount an agitator therein which is rotated by a sprocket wheel 14 and chain 15 that is operated from the pipe 7 of the freezer.

The tilting table is employed to incline the freezer can at any desired angle in order to retain the cream at the rear end of the can in the event of the cream freezing slowly or to elevate the rear end of the can and incline the forward end of the same to more rapidly discharge the frozen cream and to accomplish this a shaft 17 is journaled in the frame of the freezer and is provided on its one end with a suitable operating wheel 18. The shaft 17 carries a beveled pinion 17' which meshes with a beveled pinion 18' carried on the vertical screw 19 which passes through the table of the machine. It will thus be seen that when the wheel 18' is rotated the screw 19 will be revolved and the one end of the table raised or lowered as desired.

My present invention resides, in combination with the construction just described, in an indicating pointer 20 which is secured by any desired means to the edge of the tilting table and upon the frame work 1 I secure an arc shaped scale 21, this scale being graduated as indicated at 22, the graduation representing the degrees of the arc which the tilting table will describe when raised or lowered by revolving the wheel 18'. The indicating pointer 20 is adapted to overlie the arc shaped scale whereby the angle of the inclination of the table may be determined by examining the graduations of the scale, and to further facilitate this observation I place upon the scale a mark 23 which will determine the normal or horizontal position of the tilting table.

The reference numeral 24 indicates a slot which is formed vertically within the side wall of the reservoir 4 and over this slot is placed a glass plate 25, the plate being secured to the side of the reservoir by a plate 26, this plate being graduated as indicated at 27 upon each side of the slot whereby the quantity or amount of cream within the reservoir may be readily determined also the amount of cream which is being frozen in a prescribed time.

The reference numerals 28, 28 indicate mercury tubes which are arranged upon the side of the freezing agent tub, and as illustrated in Fig. 2 of the drawing, where a vertical sectional view of a portion of the tub upon which the mercury tube is mounted, is shown. The mercury tube is supported in a receptacle 29 formed integral with the side of the freezing can (see Fig. 2) and in order that observations may be made from the mercury tube, I have formed in the slats 30 slots 31 over which a plate 32 is placed this plate being graduated as indicated at 33, these graduations corresponding to the degrees of temperature of a thermometer and by employing the mercury tube it will be readily seen that the temperature of the freezing agent within the tub and the temperature of the air which surrounds the tub may be determined by examining the thermometer carried thereby.

The reference numeral 34 designates a partition which is placed in the freezing agent tub preferably near the rear end of the tub the partition being cut away to permit the freezing can 35 to revolve within the tub. This partition 34 forms two compartments 36 and 37 the compartment 36 being larger than the compartment 37 and in the forward end of the tub I secure an inlet pipe 38 and in the side of the tub preferably near the top I secure an outlet pipe 39 which extends downwardly and leads to a suitable receptacle as will be hereinafter more fully described.

In the end of the tub I secure an outlet pipe 40 and this pipe connects by a pipe 41 with the pipe 39 and upon said pipe I locate a valve 42 and between the connection 43 of the pipe 41 with the pipe 39 and the outlet of the pipe 39 I locate a valve 44.

In freezing or cooling a fluid such as cream or the like I may employ any suitable freezing agent but I preferably employ ice and salt or brine and the use of these freezing agents will be now described. When ice and salt are employed the ice is placed in the compartment 36 of the tub and I thoroughly mix this ice with salt, this combination of freezing ingredients maintaining a low degree of temperature within the compartment 36 which can be observed from the thermometer carried upon the side of the tub opposite this compartment. It is a well known fact that in freezing cream that it is essential that when the cream is first admitted to the freezing tub that the process of freezing the same be carried on at a comparatively high degree of temperature to permit the cream to congeal and to obtain the best results therefrom. It is therefore necessary that the temperature in the compartment 37 should be higher than the temperature in the compartment 36 owing to the fact that the cream in my improved freezer is admitted to the end of the can which lies in the compartment 37. By placing the ice and salt within the compartment 36 the brine formed by the ice and salt will flow rearwardly into the compartment 37, the partition 34 not fitting the walls of the tub sufficiently to prevent the seepage of the brine therethrough and upon the brine reaching the compartment 37, the cream which is admitted in the end of the freezer will be slowly and gradually frozen until a sufficient quantity of cream has entered the can to cause the same to move forward into that part of the can which lies in the compartment 36, and as the ice and salt in this compartment maintains a low degree of temperature, the cream will be thoroughly frozen and emitted from the discharge tube of the freezing can.

In event of the brine formed by the ice and salt within the compartments 36 and 37 having reached such a stage as to overflow, the same will pass out through the outlet pipes 39 and 40 and be discharged from the pipe 39 into a suitable brine receptacle (not shown). When it is desired to remove the brine from the freezing agent tub, the table 2 is tilted to permit the same to flow to the forward end of the tub and be discharged through the pipe 38, a suitable valve (not shown) may be employed in connection with this pipe to prevent the brine which may accumulate within the compartment 36 from being discharged therefrom during the process of freezing the cream. Should the brine within the compartment 36 reach such a height as to overflow with out passing by the partition 34, the valve 44 may be closed which would retain the brine within the compartment 36 and force the same by the partition into the compartment 37, where if it should reach such a height as to overflow it could pass through the outlet pipe 40, through pipe 41, into the pipe 39 from where it could be discharged into a suitable receptacle.

Where it is desired to freeze the fluid or cream by the use of brine, it is forced through the pipe 38 into the compartment 36 and then into the compartment 37 and should the same reach such a height as to overflow it will be conveyed from the freezing agent tub through the pipes 41 and 39 as heretofore described in the application of ice and salt as a freezing agent.

By employing the graduated scale upon the reservoir and the means for determining the inclination of the tilting table, I have provided a novel manner of determining the rapidity at which the cream should be fed through the freezing can carried within the tub, and by observing the thermometer and determining the temperature of the freezing agent within the tub, the person operating the freezing machine will, by experiment, be able to determine at just what angle the table should be inclined in order that the cream within the reservoir will flow into and through the freezing can to produce a frozen cream of a fine consistency.

It has also been found by experiment that when the cream is rapidly fed through the freezer that the consistency of the same is of a coarse nature and that by slowly feeding the cream through the freezer, permitting the slow freezing process of the same, the consistency of the cream is of a fine and smooth nature which is desirable for commercial purposes.

What I claim is:—

1. In a freezing machine, the combination with the horizontally arranged tub and a vertical partition arranged in said tub and dividing the tub into compartments, said partition being formed with openings for the passage of a freezing agent from one compartment to the other, of a freezing can supported within the tub on a horizontal axis, and extending into the tub on both sides of said partition.

2. In a freezing machine of the character set forth, the combination with a tilting table, the tub mounted on said table a freezing can arranged in said tub, a cream reservoir mounted on said table and communicating with said can, means for supplying a freezing agent to said tub and withdrawing the same therefrom, of means for regulating the supplying of cream to the can and means for regulating the passage of the freezing agent through the tub whereby the rapidity at which the cream is frozen may be governed.

3. In a freezing machine, a tub, said tub having two compartments formed therein, inlet and outlet ports formed in one compartment, the other of said compartments having an outlet port formed therein and communicating with the first named outlet port, and means for controlling said ports.

4. In a freezing machine, a tub, a freezing can arranged within said tub and a partition arranged within the tub and surrounding the can and separating the tub into two compartments, with means for introducing a freezing agent into one of said compartments, and means for leading the freezing agent from the compartment in which it is first placed into the other of said compartments.

5. In a freezing machine, the combination of a tub, a tilting table on which said tub is mounted, a freezing can arranged within the tub, a vertical partition disposed within the tub and dividing the same into two compartments, said partition having ports or passageways whereby a fluid can pass from one compartment of the tub to the other and means for tilting said table to effect the flow of liquid from one compartment to the other.

6. In a freezing machine, the combination with a tub adapted to receive a freezing-agent, of a vertical partition within the tub and separating the chamber therein into compartments, and a freezing can extending through said partition into the different compartments in the tub.

7. In a freezing machine, a horizontally disposed tub adapted to receive a freezing-agent and divided by a vertical partition into compartments, and a freezing can extending into all of said compartments.

In testimony whereof I affix my signature in the presence of two witnesses.

HENRY J. GERNER.

Witnesses:
C. C. McMAHON,
JOHN PATERSON.